US010565121B2

(12) United States Patent
Jiang (10) Patent No.: US 10,565,121 B2
(45) Date of Patent: Feb. 18, 2020

(54) METHOD AND APPARATUS FOR REDUCING READ/WRITE CONTENTION TO A CACHE

(71) Applicant: ALIBABA GROUP HOLDING LIMITED, George Town, Grand Cayman (KY)

(72) Inventor: Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 21 days.

(21) Appl. No.: 15/381,672

(22) Filed: Dec. 16, 2016

(65) Prior Publication Data

US 2018/0173640 A1 Jun. 21, 2018

(51) Int. Cl.
*G06F 12/0895* (2016.01)
*G06F 3/06* (2006.01)
*G06F 12/0864* (2016.01)

(52) U.S. Cl.
CPC .......... *G06F 12/0895* (2013.01); *G06F 3/061* (2013.01); *G06F 3/0656* (2013.01); *G06F 3/0659* (2013.01); *G06F 3/0673* (2013.01); *G06F 12/0864* (2013.01); *G06F 2212/1016* (2013.01); *G06F 2212/221* (2013.01)

(58) Field of Classification Search
CPC .... G06F 12/0895; G06F 3/061; G06F 3/0656; G06F 3/0659; G06F 3/0673; G06F 12/0864; G06F 221/1016; G06F 2212/221
See application file for complete search history.

(56) References Cited

U.S. PATENT DOCUMENTS

| | | | | |
|---|---|---|---|---|
| 5,226,009 A | * | 7/1993 | Arimoto | G06F 12/0893 365/189.04 |
| 5,630,075 A | * | 5/1997 | Joshi | G06F 12/0804 711/100 |
| 5,675,765 A | * | 10/1997 | Malamy | G06F 12/123 711/128 |
| 5,678,020 A | | 10/1997 | Singh et al. | |
| 5,680,572 A | * | 10/1997 | Akkary | G06F 12/0859 711/118 |
| 6,038,647 A | * | 3/2000 | Shimizu | G06F 12/0846 711/129 |

(Continued)

FOREIGN PATENT DOCUMENTS

| JP | H 08320827 A | 12/1996 |
|---|---|---|
| JP | 2005258789 A | 9/2005 |

OTHER PUBLICATIONS

Jouppi, Norman P. Cache write policies and performance. vol. 21. No. 2. ACM, 1993. (Year: 1993).*

(Continued)

*Primary Examiner* — Francisco A Grullon
(74) *Attorney, Agent, or Firm* — Finnegan, Henderson, Farabow, Garrett & Dunner, LLP (57) ABSTRACT

A cache is presented. The cache comprises a tag array configured to store one or more tag addresses; a tag control buffer configured to store cache control information; a data array configured to store data acquired from a memory device; and a write buffer configured to store information related to a write request. The tag array is configured to be accessed independently from the tag control buffer, and the data array is configured to be accessed independently from the write buffer.

19 Claims, 5 Drawing Sheets

(56) References Cited

U.S. PATENT DOCUMENTS

| | | | |
|---|---|---|---|
| 6,119,205 A * | 9/2000 | Wicki | G06F 12/0804 711/122 |
| 6,557,084 B2 | 4/2003 | Freerksen et al. | |
| 6,993,633 B1 * | 1/2006 | Sakakibara | G06F 12/084 711/119 |
| 9,268,542 B1 | 2/2016 | Mars et al. | |
| 9,811,273 B1 * | 11/2017 | Brahmadathan | G06F 3/0619 |
| 9,886,987 B1 * | 2/2018 | Brahmadathan | G11C 7/1072 |
| 2003/0101320 A1 * | 5/2003 | Chauvel | G06F 12/0888 711/154 |
| 2004/0117580 A1 | 6/2004 | Wu et al. | |
| 2004/0215900 A1 | 10/2004 | Guthrie et al. | |
| 2004/0243764 A1 | 12/2004 | Miller | |
| 2005/0188155 A1 * | 8/2005 | Schubert | G06F 12/0804 711/122 |
| 2005/0235115 A1 * | 10/2005 | Franaszek | G06F 12/0862 711/133 |
| 2007/0101067 A1 | 5/2007 | Shafi et al. | |
| 2008/0201530 A1 * | 8/2008 | Franaszek | G06F 12/0862 711/137 |
| 2008/0263257 A1 * | 10/2008 | Cain, III | G06F 12/0862 711/3 |
| 2009/0006756 A1 | 1/2009 | Donley | |
| 2009/0201935 A1 * | 8/2009 | Hass | G06F 9/30054 370/395.32 |
| 2010/0275209 A1 | 10/2010 | Detlefs | |
| 2011/0035616 A1 * | 2/2011 | Henry | G06F 11/10 714/2 |
| 2012/0124327 A1 | 5/2012 | McCcombs | |
| 2012/0233393 A1 * | 9/2012 | Jiang | G06F 9/46 711/105 |
| 2013/0282987 A1 | 10/2013 | Koob et al. | |
| 2014/0019823 A1 * | 1/2014 | Ramirez | G06F 11/1064 714/755 |
| 2015/0036418 A1 | 2/2015 | Chai et al. | |
| 2015/0046658 A1 * | 2/2015 | Wilson | G06F 12/0895 711/135 |
| 2015/0089155 A1 | 3/2015 | Busaba et al. | |
| 2016/0210245 A1 * | 7/2016 | Tseng | G06F 12/0292 |
| 2017/0255572 A1 | 9/2017 | Rohe et al. | |
| 2017/0351610 A1 * | 12/2017 | Tran | G06F 12/0815 |

OTHER PUBLICATIONS

PCT Notification of Transmittal of and containing the International Search Report and Written Opinion issued in International Application No. PCT/US2017/066730, dated Apr. 24, 2018, 14 pages.

* cited by examiner

METHOD AND APPARATUS FOR REDUCING READ/WRITE CONTENTION TO A CACHE

TECHNICAL FIELD

The present disclosure generally relates to the field of computer architecture, and more particularly, to a method and an apparatus for reducing read/write contention to a cache.

BACKGROUND

Volatile memory, such as dynamic random-access memory (DRAM), provides temporary storage space that can be accessed by a computer processor at a reasonable speed. The volatile memory can be used to store instructions and data, which can then be fetched to the computer processor for processing. The computer processor can also store a result of the processing into the volatile memory for subsequent processing. Although DRAM provides reasonable access speed, memory access latency remains a bottleneck to the computer processor, as the processing speed of computer processor, as well as the storage capacity of DRAM, keeps increasing thanks to Moore's Law. Accordingly, contemporary computer processors typically deploy a hierarchical memory system including a cache, to speed up memory access.

SUMMARY

Embodiments of the present disclosure provide a cache. The cache comprises a tag array configured to store one or more tag addresses, a tag control buffer configured to store cache control information, a data array configured to store data acquired from a memory device, and a write buffer configured to store information related to a write request. The tag array is configured to be accessed independently from the tag control buffer, and the data array is configured to be accessed independently from the write buffer.

Embodiments of the present disclosure also provide a method of operating a cache that comprises a tag array, a tag control buffer, a data array, and a write buffer. The method comprises: receiving a first write request including write data and a memory address; receiving a second data access request; determining a tag address based on the memory address; performing a first read operation to the tag array to determine if there is a cache-hit; and responsive to determining that there is a cache-hit: performing a write operation to the write buffer to store information related to the first write request, performing a write operation to the tag control buffer to update stored cache control information, performing second read operations to the tag array and to the data array for the second data access request, and performing a write operation to a first data entry of the data array based on the information related to the first write request stored in the write buffer.

Embodiments of the present disclosure also provide a computer system. The computer system comprises a hardware processor and a hierarchical memory system coupled with the hardware processor. The hierarchical memory system comprises a dynamic random access memory device and a cache. The cache comprises a tag array configured to store one or more tag addresses, a tag control buffer configured to store cache control information, a data array configured to store data acquired from the dynamic random access memory device, and a write buffer configured to store information related to a write request from the hardware processor. The tag array is configured to be accessed independently from the tag control buffer, and the data array is configured to be accessed independently from the write buffer.

Embodiments of the present disclosure also provide a cache. The cache comprises a tag array configured to store one or more tag addresses and cache control information, a data array configured to store data acquired from a memory device, and a write buffer configured to store information related to a write request. The data array is configured to be accessed independently from the write buffer.

Embodiments of the present disclosure also provide a method of operating a cache that comprises a tag array, a data array, and a write buffer. The method comprises: receiving a write request including a first data and a memory address; determining a tag address based on the memory address; performing a read operation to the tag array to determine if there is a cache-hit; responsive to determining that there is a cache-hit, performing a write operation to the write buffer to store the first data, and performing a write operation to the tag array to update stored cache control information; and responsive to determining that preset condition is satisfied, performing a write operation to the data array based on the first data stored in the write buffer.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Embodiments of the present disclosure provide a cache that comprises a tag array configured to store one or more tag addresses, a tag control buffer configured to store cache control information, a data array configured to store data acquired from a memory device, and a write buffer configured to store information related to a write request. According to embodiments of the present disclosure, the tag array is configured to be accessed independently from the tag control buffer, and the data array is configured to be accessed independently from the write buffer. After receiving a write request and determining that the write request leads to a cache-hit, the cache may, instead of performing the write request, store information related to the write request in the write buffer. The cache can then process a subsequent access request, and then perform the delayed write request based on the information stored in the write buffer. With such an arrangement, even if the data array comprises single-ported SRAM devices that do not allow simultaneous read and write operations, the cache needs not wait for the write request to be completed before processing the subsequent access request. As a result, the latency due to read/write contention at the single-ported SRAM devices can be reduced, and the performance of the cache can be substantially improved.

Figure 1:
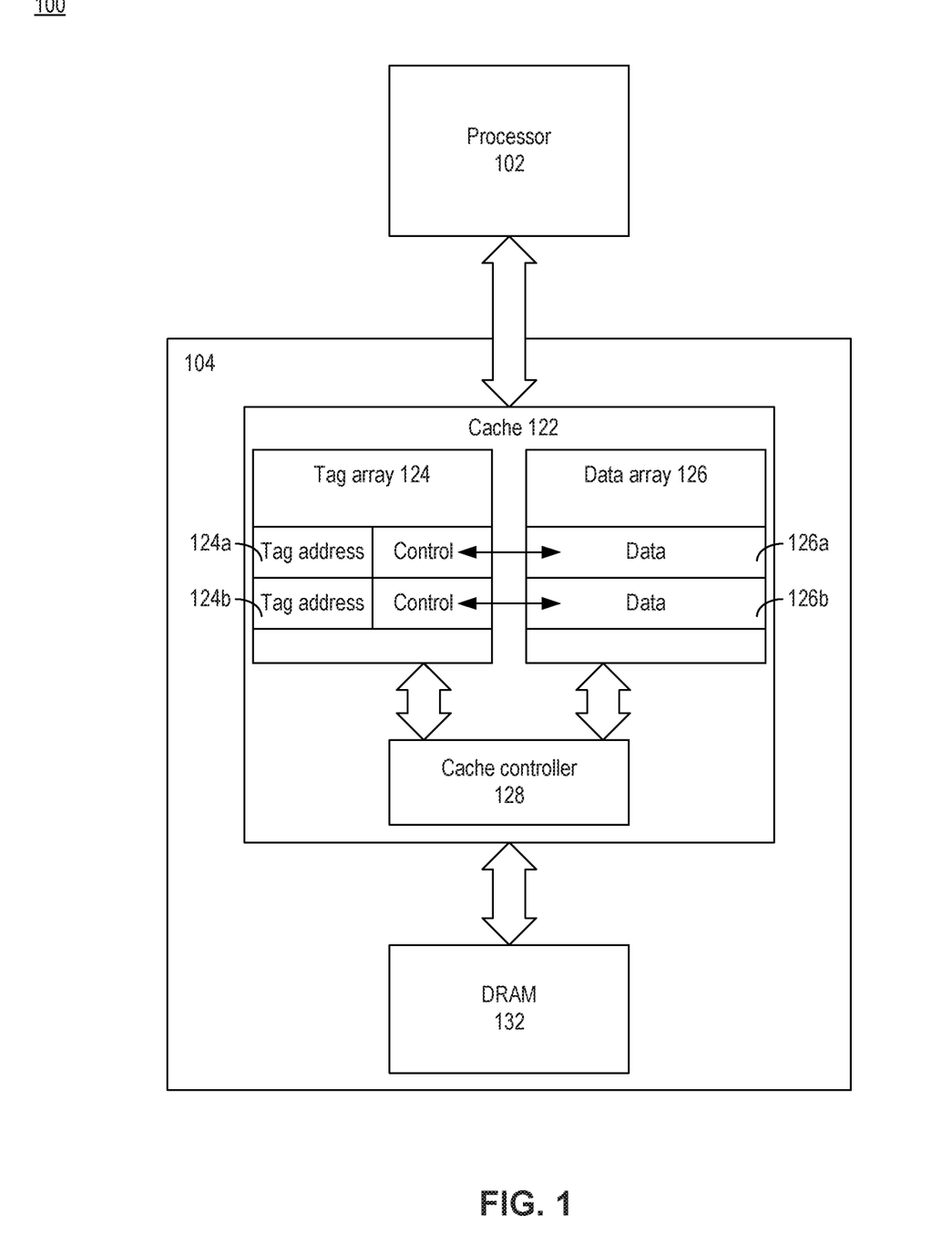
FIG. 1 is a diagram illustrating a computer system in which embodiments of the present disclosure can be used.

Reference is now made to FIG. 1, which illustrates a computer system 100 in which embodiments of the present disclosure can be used. As shown in FIG. 1, computer system 100 includes a computer processor 102 and a hierarchical memory system 104. Memory system 104 includes a cache 122 and a DRAM 132. Although FIG. 1 illustrates that cache 122 is separate from computer processor 102, it is understood that cache 122 can also be a part of an integrated circuit chip that includes computer processor 102. Cache 122 can also be a part of an integrated circuit chip that includes DRAM 132, or can exist as a standalone chip.

Cache 122 is typically built using static random-access memory (SRAM) devices, which provide higher access speed than a DRAM device but also include more transistors and consume more power than a DRAM device of the same storage capacity. Cache 122 can be used as an intermediate buffer to store a subset of data stored in DRAM 132, such that the data stored in cache 122 correspond to at least a part of the data stored in DRAM 132. That subset of data are typically the most recently accessed data by computer processor 102, which can include data that are acquired from DRAM 132 according to a data read operation, or data that are modified by computer processor 102 and to be stored in DRAM 132 according to a data write operation. Due to temporal and spatial localities, such data (as well as other data that are stored in nearby memory locations) are likely going to be accessed by computer processor 102 again. When computer processor 102 tries to access such data again, it can read it from cache 122 (which results in a cache-hit) instead of from DRAM 132. By increasing the access speed of these data, the effect of access latency of DRAM 132 on the overall speed of computer system 100 can be reduced.

As shown in FIG. 1, cache 122 includes a tag array 124, a data array 126, and a cache controller 128. Cache 122 can be a direct-mapped cache. Both tag array 124 and data array 126 includes a plurality of entries, including tag entries 124a and 124b, and data entries 126a and 126b. Data array 126 stores the memory data acquired from DRAM 132 that was accessed (or will likely be accessed) by computer processor 102. The data stored in each data entry of data array 126 is associated with a tag address. The tag address can be derived from the memory address of that data in DRAM 132. Each tag entry of tag array 124 may store a tag address associated with a data entry in data array 126, such that the tag entry corresponds to the data entry. Tag array 124 also stores control information for cache operation with each tag address. The control information may include data coherency state and least recently used (LRU) information. The data coherency state may indicate a state of coherency between the data stored in the cache and the corresponding data stored in the memory, in the event that the data in the cache is overwritten by computer processor 102 in a cache write operation. The LRU information reflects a history of access (either read or write access) of a data entry in data array 126, and can include a flag that indicates whether a data entry is the least recently accessed among the data entries in data array 126.

Cache controller 128 manages the read and write operations to cache 122. When cache controller 128 receives a request to access (read or write) cache 122 from computer processor 102, it determines a tag address from the request. Cache controller 128 then performs a read operation to tag array 124 to determine whether it stores a matching tag address. In a case where the cache is a direct-mapped cache, if a matching tag address is found in one of the tag entries in tag array 124, cache controller 128 can determine that there is a cache-hit. Cache controller 128 can then perform a read operation to the data entry that corresponds to the matching tag entry, and transmit the data stored in the data entry back to computer processor 102. Cache controller 128 may also update both the data coherency state and LRU information in tag array 124, as well as data stored in data array 126, in a cache write operation.

Figure 2A:
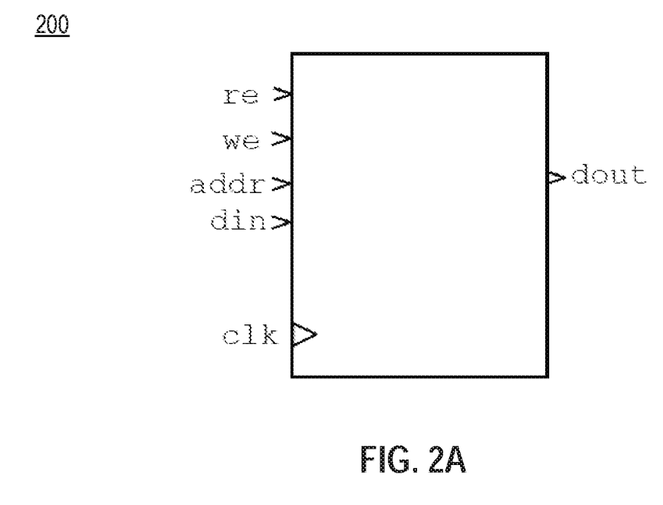
FIGS. 2A-B are schematic diagrams illustrating single-ported and dual-ported memory devices that can be used in embodiments of the present disclosure.

With the current technology, both tag array 124 and data array 126 are constructed using SRAM devices. Some SRAM devices are single-ported devices. Reference is now made to FIG. 2A, which illustrates a typical single-ported SRAM cache 200. As shown in FIG. 2A, SRAM cache 200 includes a single address (addr) for selecting one or more single-ported SRAM devices. The selected devices can be for a write operation to store input data (din), when the write enable signal (we) is asserted. The selected devices can also be for a read operation to provide stored data as output data (dout), when the read enable signal (re) is asserted. Typically single-ported SRAM devices include shared bit lines for read and write operation, with the write enable and read enable signals controlling whether the bit lines are to be driven by the input data port (for a write operation) or to be driving the output data port (for a read operation). Therefore, the selected SRAM devices cannot process a read operation and a write operation simultaneously, otherwise there will be a contention between the input data port and the output data port at the shared bit lines.

Figure 2B:
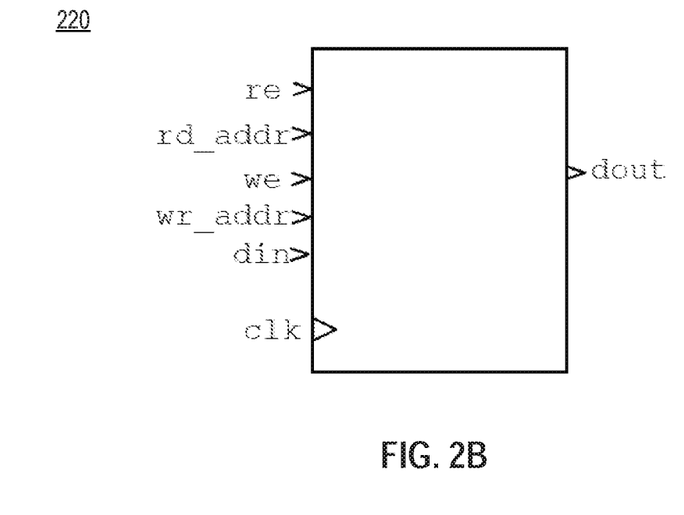

On the other hand, some SRAM devices are dual-ported devices, which allow simultaneous read and write operations. Typically dual-ported SRAM devices include separate bit lines for read operation and for write operation. Reference is now made to FIG. 2B, which illustrates a typical dual-ported SRAM cache 220. As shown in FIG. 2B, SRAM cache 220 includes an address for read operation (rd_addr) and an address for write operation (wr_addr). SRAM cache 220 allows different sets of SRAM devices being selected for read and write operations simultaneously, or the same set of SRAM devices being selected for simultaneous read and write operations.

Compared with caches constructed with dual-port SRAM devices with the same storage capacity, single-ported SRAM caches generally include fewer transistor devices and signal routes, and can provide up to 50% reduction in chip size and power consumption. Single-ported SRAM cache, however, can cause serious performance degradation due to its inability of handling read and write operations simultaneously.

To provide an illustrative example, referring to FIG. 1, assume that computer processor 102 transmits a write request to write data into data entry 126a, and then a read request to read data from data entry 126b, with both requests resulting in consecutive cache-hits. The write request may result in a write operation to the LRU information and data coherency status stored in tag entry 124a that corresponds to data entry 126a. Moreover, the read request may also result in a read operation to access the tag addresses stored in tag entries 124a and 124b, as cache controller 128 searches through tag array 124 to determine if there is a matching tag address.

If tag array 124 is constructed using a dual-ported SRAM device, the write operation to tag array entry 124a and the read operations to tag array entries 124a and 124b may occur simultaneously. On the other hand, if tag array 124 is constructed using a single-ported SRAM device, the write operation to tag array entry 124a and the read operations to tag array entries 124a and 124b cannot occur simultaneously. For example, after write operation to tag entry 124a starts (for processing the write request), the read operations to tag entries 124a and 126a (for processing the read request) cannot proceed and must wait until the write operation to tag array entry 124a completes. Similarly, if data array 126 is constructed using a single-ported SRAM device, after the write operation to data entry 126a starts (for processing the write request), the read operation to data entry 126b (for processing the read request) also cannot proceed and must wait until the write operation to data entry 126a finishes.

Despite the consecutive cache-hits, the wait time caused by the read/write contentions still significantly degrades the performance of single-ported cache 122, compared to situations when cache 122 is constructed using dual-port SRAM devices where read/write contentions do not exist. With the current technology, it is often for caches to achieve a cache-hit rate of up to 90%. Therefore, removing the read/write contentions during cache-hits can significantly improve the performance of single-ported SRAM devices.

Figure 3:
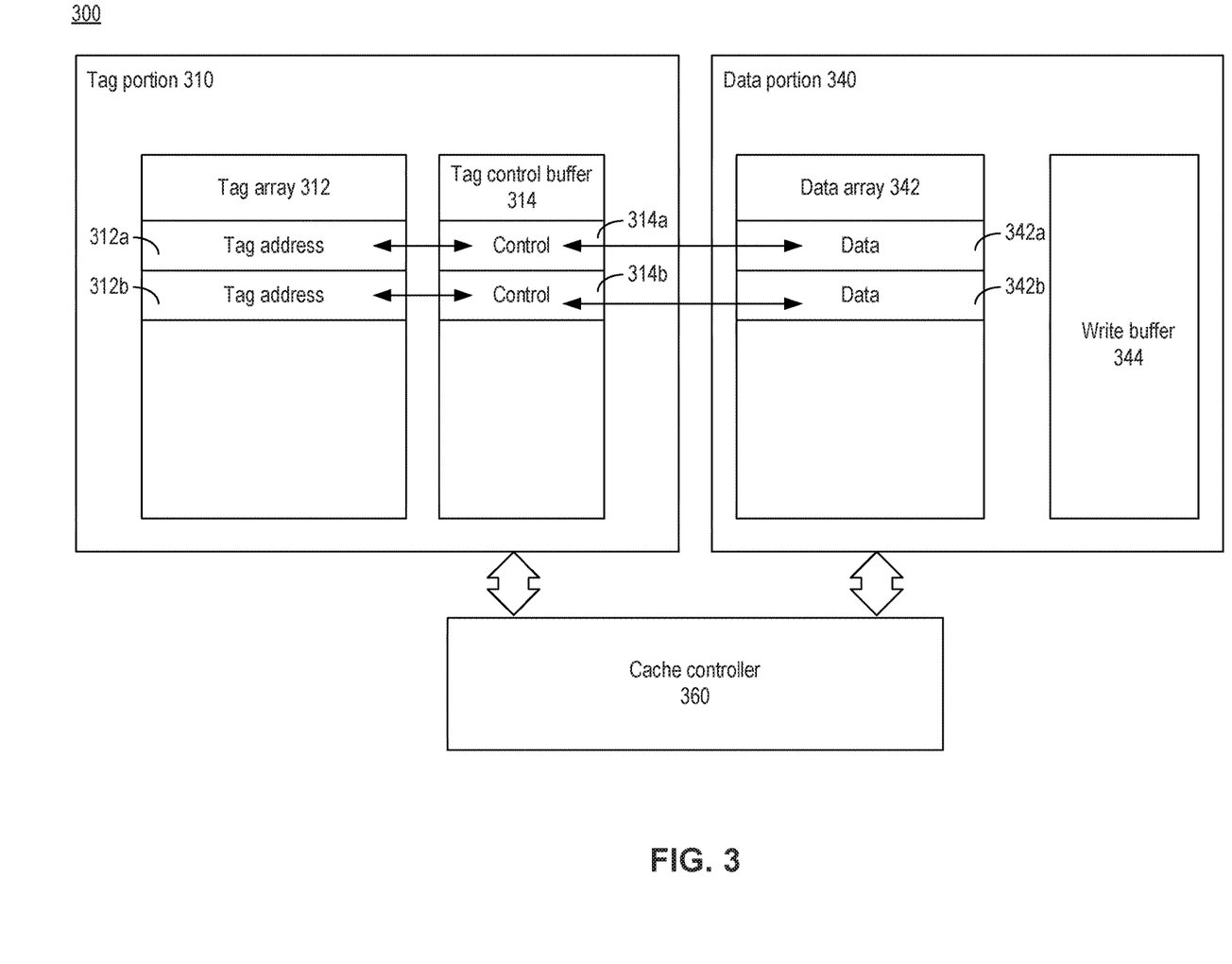
FIG. 3 is a schematic diagram illustrating an exemplary cache, consistent with embodiments of the present disclosure.

Reference is now made to FIG. 3, which illustrates an exemplary cache 300 according to embodiments of the present disclosure. Cache 300 may be a part of a hierarchical memory system (e.g., memory system 104 of FIG. 1) that processes data access requests from a computer processor (e.g., computer processor 102), and may replace cache 122 of FIG. 1 It is understood that cache 300 can also be a part of an integrated circuit chip that includes computer processor 102. Cache 300 can also be a part of an integrated circuit chip that includes DRAM 132 of FIG. 1, or can exist as a standalone chip. Cache 300 can be a direct-mapped cache.

As shown in FIG. 3, cache 300 may include a tag portion 310, a data portion 340, and a cache controller 360. Tag portion 310 may include a tag array 312 and a tag control buffer 314. Each entry of tag array 312 may store tag addresses, and each entry of tag control buffer 314 may store control information including data coherency state and LRU information. Tag array 312 may be constructed using single-ported or dual-ported SRAM devices, while tag control buffer 314 may be constructed using sequential logic blocks such as flip-flops, latches, etc., or any circuit blocks (e.g., dual-ported SRAM devices). Moreover, tag array 312 and control buffer 314 may include its own read and write enable signals, entry selection signals, etc. With such arrangements, tag array 312 and control buffer 314 can be accessed (read or write) independently from each other. Although FIG. 3 illustrates that tag portion 310 includes both tag array 312 and tag control buffer 314, it is understood that tag control buffer 314 can be separated from tag portion 310, or that tag array 312 may store the cache control information as well.

Moreover, data portion 340 also includes a data array 342, and a write buffer 344. Each entry of data array 342 and write buffer 344 may store the actual data that was accessed (or will likely be accessed) by computer processor 102 of FIG. 1. Data array 342 may be constructed using single-ported or dual-ported SRAM devices. Write buffer 344 may also be constructed using single-ported or dual-ported SRAM devices, or with sequential logic blocks such as flip-flops and latches. Data array 342 and write buffer 344 may include its own read and write enable signals, entry selection signals, etc. With such arrangements, data array 342 can be accessed (read or write) independently from write buffer 344.

Each entry of data array 342 and write buffer 344 may have different sizes. For example, each entry of data array 342 may correspond to a cache line, which is typically 64 bytes. Each entry of write buffer, on the other hand, may have a size of 4 bytes, which may correspond to the size of data requested by a typical write operation.

In some embodiments, cache controller 360 can control the read and write operations at tag portion 310 and data portion 340 to implement a predetermined caching policy. Cache controller 360 can include digital logic circuitries, and can be either a standalone application specific integrated circuit (ASIC), a field programmable gate array (FPGA), or a part of computer processor 102. Cache controller 360 may also be capable of executing instructions (e.g., firmware, micro-codes, etc.) to control the read and write operations. The instructions may be stored in a computer readable medium that may be volatile or non-volatile, magnetic, semiconductor, tape, optical, removable, non-removable, etc., and is accessible by cache controller 360.

In some embodiments, cache controller 360 can implement a caching policy to reduce the latency caused by write operations to tag portion 310 and data portion 340. After receiving (e.g., from computer processor 102) a request to write data into a certain entry of data array 342, and that the write request leads to a cache-hit (e.g., when the tag address derived from the request is found in tag array 312), cache controller 360 can withhold the write operation to data array 342, and store information related to the write operation in write buffer 344. The information stored in write buffer 344 may include, for example, the write data to be stored in data array 342, an identifier (e.g., tag address, a pointer, or any identifier) for identifying an entry in data array 342 to receive the write data, and a location within that entry, which typically can be derived by the bit offset included in the memory address. Cache controller 360 can then proceed to process the next data request (e.g., a read request) from computer processor 102.

Cache controller 360 can perform the delayed write request using the information stored in write buffer 344 in various scenarios. As an example, cache controller 360 can perform the delayed write request when the write buffer is full and cannot accept additional information. In this case, the number of entries of write buffer 344 can be designed based on, for example, an expected number of write requests from computer processor 102, a number of entries of data array 342, which may determine a number of cache-hits within the predetermined period, a performance target of the cache, etc.

As another example, cache controller 360 may also perform the delayed write request when cache controller 360 has not received any request for accessing cache 300 within a predetermined period, or a predetermined period for completion of a read request. The pre-determined period can also be specific (e.g., whether the cache is a L1 cache, L2 cache, etc.), and can be in the range of nanoseconds.

Moreover, cache controller 360 can also perform the delayed write request when a subsequent read or write request is directed to the same entry in data array 342 as the delayed write request. In such a case, to ensure that the subsequent read or write request operates on the most updated data in cache 300, cache controller 360 can perform the delayed write request and merge the write data associated with the delayed write request with the data stored in an associated entry in data array 342. After the delayed write request is performed, the information stored in write buffer 344 can be removed, or overwritten by new data. In some embodiments, write buffer 344 can associate a status flag with each entry to indicate whether the data stored in the entry has been written into data array 342. If the flag indicates that the data has been written into data array 342, the data can be overwritten or removed.

With embodiments of the present disclosure, cache 300 does not always have to wait for a write request to complete before processing a subsequent read or write request. After receiving the write request and determining that it leads to a cache-hit, cache controller 360 can store information related to the write request into write buffer 344 for later processing. After (or concurrent with) storing the information in write buffer 344, cache controller 360 can process the subsequent read or write request.

Moreover, as discussed above, tag array 312 and tag control buffer 314 can be configured to allow independent accesses, such that during a cache-hit, when tag control buffer 314 receive a write operation (e.g., to update the LRU information for an entry in data array 342 that has been accessed for a cache-hit), tag array 312 can simultaneously handle a read operation for tag address search. For example, when tag control buffer entry 314a receives a write operation due to a write request, tag array 312 remains accessible to cache controller 360.

With such an arrangement, even if tag array 312 and data array 342 are constructed with single-ported SRAM devices that cannot process read and write operations simultaneously, the latency caused by write operation to the processing of subsequent requests can be reduced. For example, assuming computer processor 102 transmits a write request that leads to a write operation to data entry 342a, and then a read request that leads to a read operation to data entry 342b, both of which lead to cache-hits, the subsequent read operation to data entry 342b can proceed without waiting for the write operation to data entry 342a completes. Similarly, if the write request also leads to a write operation to tag control buffer 314 (e.g., to update the LRU information and/or the data coherency status), the write operation can be performed independently, and concurrently, with the read operations to tag array 312 as cache controller 360 searches for a matching tag address when processing the read request.

As discussed above, with the current technology, it is often for caches to achieve a cache-hit rate of up to 90%. Therefore, with embodiments of present disclosure, the latency due to read/write contentions during cache-hits can be reduced, and the performance of a cache with tag and data arrays constructed with single-ported SRAM devices can be improved significantly.

In some embodiments, when the write request leads to a cache-miss (e.g., a tag address derived from the write request cannot be found in tag array 312), cache controller 360 may determine to process the write request instead of withholding it, and the controller may determine not to store information related to the write request in write buffer 344. Such a policy can be based on, for example, that cache-miss occurs much less frequently than cache-hits, and that a cache-miss typically requires a write operation to update an entire cache line of data, which would require a large write buffer to hold the write data. Therefore, improving latency caused by read/write contention for cache-miss may be more costly and provide less benefit than improving the same latency for cache-hit.

Figure 4:
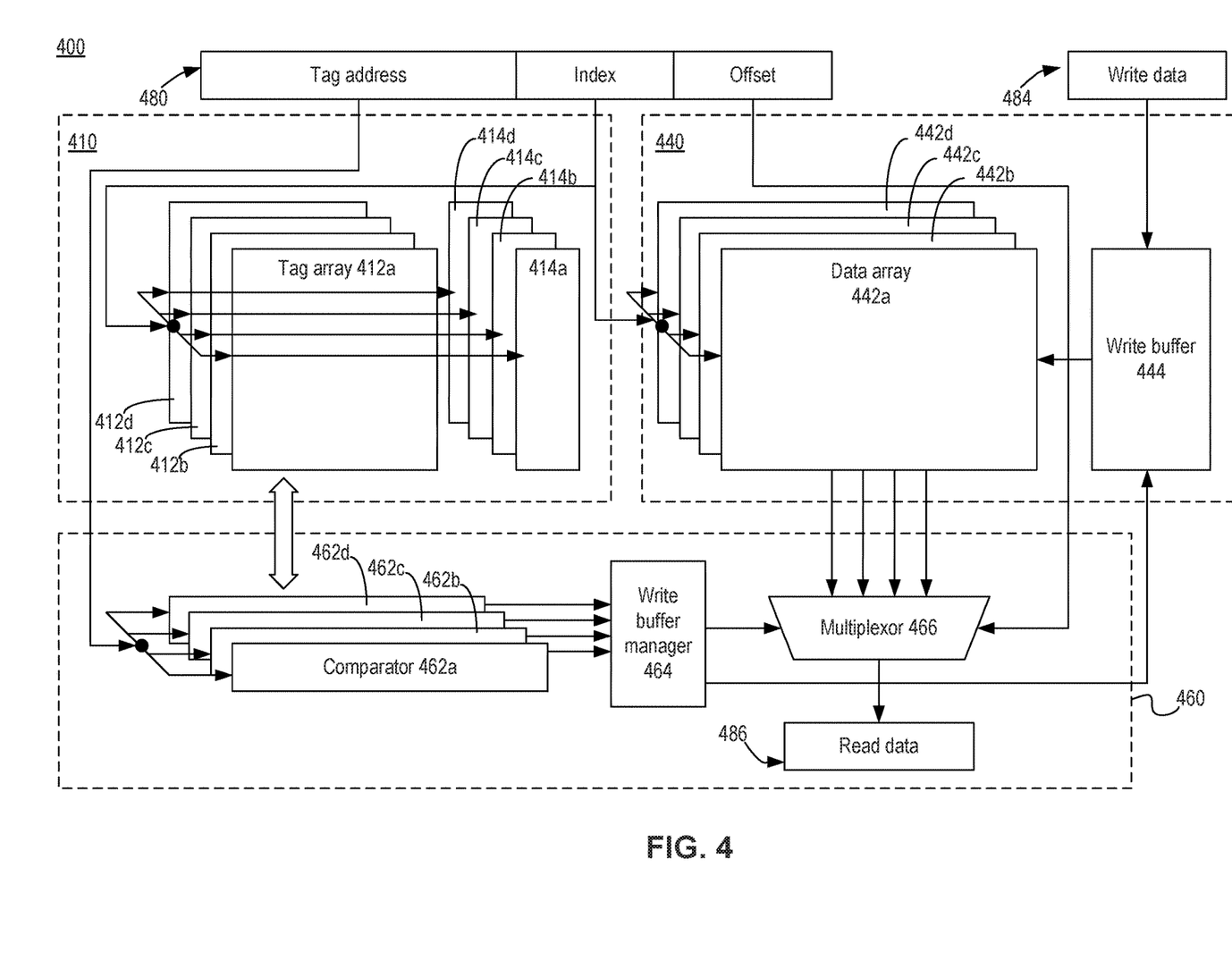
FIG. 4 is a schematic diagram illustrating another exemplary cache, consistent with embodiments of the present disclosure.

Embodiments of the present disclosure are also applicable to set-associative caches. Reference is now made to FIG. 4, which illustrates an exemplary set-associative cache 400 according to embodiments of the present disclosure. As shown in FIG. 4, cache 400 includes a tag portion 410, a data portion 440, and a cache controller 460. Tag portion 410 includes four tag arrays 412a, 412b, 412c, and 412d, and four tag control buffers 414a, 414b, 414c, and 414d. Data portion 440 also includes four data arrays 442a, 442b, 442c, and 442d, and a write buffer 444. Each tag entry in tag array 412a, 412b, 412c, and 412d may store a tag address that corresponds to a data entry in, respectively, data array 442a, 442b, 442c, or 442d. The tag address can be derived from a memory address 480 provided in a data request from computer processor 102. As an illustrative example, the tag address can be derived by extracting the first 33 bits of memory address 480. Moreover, each of tag arrays 412a, 412b, 412c, and 412d is associated with, respectively, tag control buffer 414a, 414b, 414c, or 414d, which store the LRU information and data coherency state that correspond to the tag addresses stored in the tag arrays and the data stored in the data arrays.

With four tag and data arrays, cache 400 can be a four-way set associative cache, such that a particular tag address can be stored in any of the four tag arrays, and the data associated with that tag address can be stored in any of the four data arrays. The determination of which of the four tag arrays to store the tag address, and which of the four data arrays to store the data, can be based on the index field in memory address 480.

Tag arrays 412a-d may be constructed using single-ported or dual-ported SRAM devices, while tag control buffers 414a-d may be constructed using sequential logic blocks such as flip-flops, latches, etc., or any circuit blocks (e.g., dual-ported SRAM devices). Moreover, each of tag arrays 412a-d and control buffers 414a-d may include its own read and write enable signals, entry selection signals, etc. With such arrangements, corresponding pairs of tag array and control buffer (e.g., tag array 412a and control buffer 414a) can be accessed (read or write) independently.

Moreover, data arrays 442a-d may be constructed using single-ported or dual-ported SRAM devices. Write buffer 444 may also be constructed using single-ported or dual-ported SRAM devices, or with sequential logic blocks such as flip-flops and latches. Each of data arrays 442a-d and write buffer 444 may include its own read and write enable signals, entry selection signals, etc. With such arrangements, each of data arrays 442a-d can be accessed (read or write) independently from write buffer 444.

Cache controller 460 manages the read/write operations to cache 410. Cache controller 460 can include digital logic circuitries, and can be either a standalone application specific integrated circuit (ASIC), a field programmable gate array (FPGA), or a part of computer processor 102. Cache controller 460 may also be capable of executing instructions (e.g., firmware, micro-codes, etc.) to control the read and write operations. The instructions may be stored in a computer readable medium that may be volatile or non-volatile, magnetic, semiconductor, tape, optical, removable, non-removable, etc., and is accessible by cache controller 460. Cache controller 460 may include a set of comparators 462a-d, a write buffer manager 464, and a multiplexor 466. Each of these components can be either hardware circuitries, software components, or a mixture of both.

After receiving a data access request (read or write) from computer processor 102 that includes memory address 480, cache controller 460 can perform read operations to each of tag arrays 412a-d to obtain the stored tag addresses, and compare them against the tag address derived from memory address 480 using comparators 462a-d. The read operations to each of tag arrays 412a-d can be concurrent and independent from any write operations to tag control buffers 414a-d (e.g., to update LRU information and/or data coherency status). Based on the comparison result, write buffer manager 464 can determine whether there is a cache-hit. If there is a cache-hit, and if the data access request is a write request, write buffer manager 464 can instruct write buffer 444 to store information related to the write request. The information may include, for example, write data 484 associated with memory address 480, which of the data arrays 442a-d to be written with the data, an identifier (e.g., tag address, a pointer, or any identifier) for identifying an entry in that data array to receive the write data, and a location within that entry, which typically can be derived by the bit offset included in the memory address. After (or concurrent) with storing the information at the write buffer, cache controller 460 can then process the subsequent request without waiting for the write request to be completed. On the other hand, if the data access request is a read request, data stored in the a data entry that correspond to the matching tag address will be provided to multiplexor 466, which can then extract read data 486 and provide the read data as a response to the read request.

Figure 5:
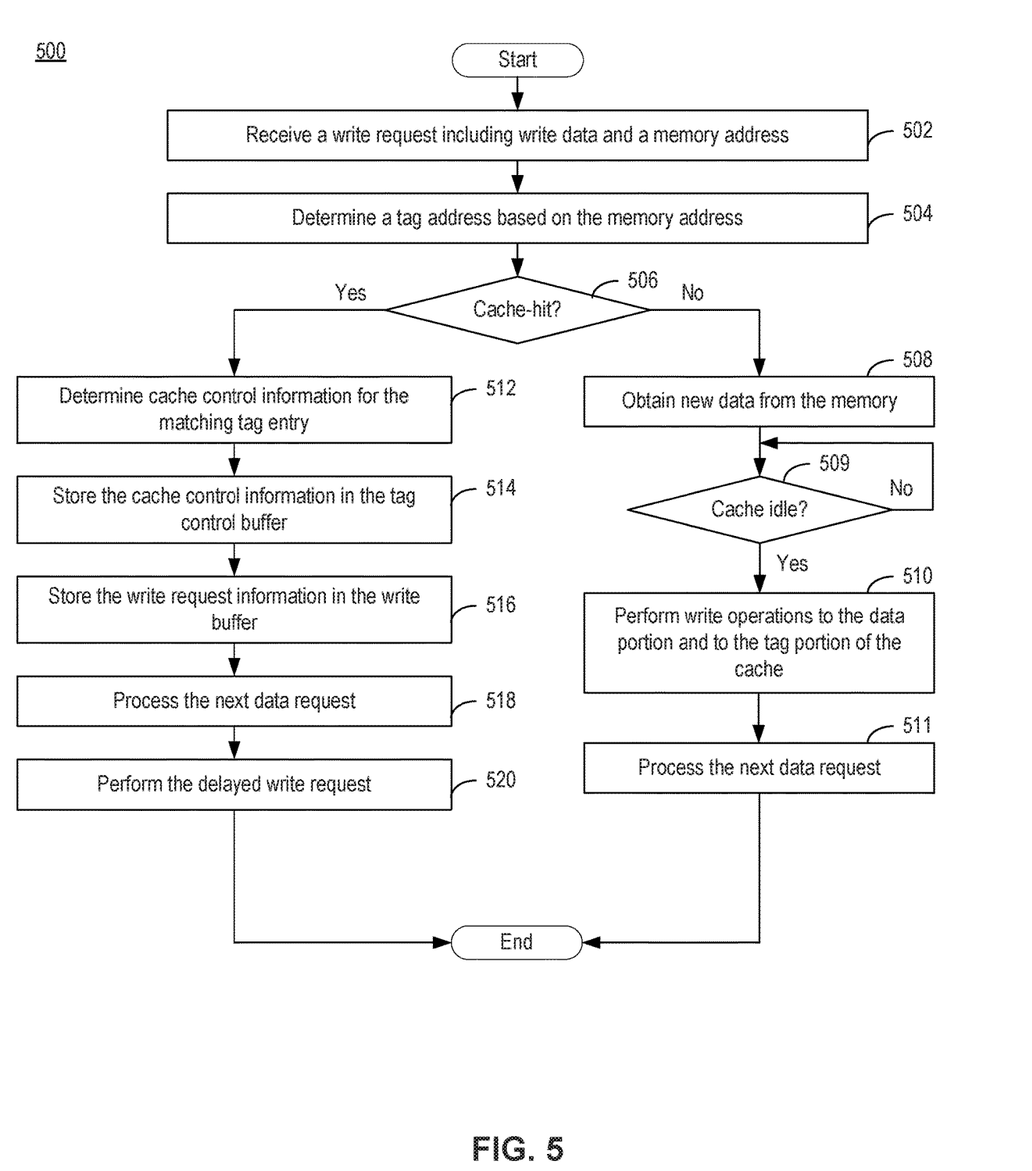
FIG. 5 is a flowchart illustrating an exemplary method of operating a cache, consistent with embodiments of the present disclosure.

Reference is now made to FIG. 5, which illustrates an exemplary method 500 of operating a cache. The method can be performed by, for example, cache controller 360 of FIG. 3 or cache controller 460 of FIG. 4. The cache can include a tag portion and a data portion, where the data portion includes a data array and a write buffer that are independently accessible. The cache may be, for example, cache 300 of FIG. 3 or cache 400 of FIG. 4.

After an initial start, the controller proceeds to step 502 and receive a write request including write data and a memory address. The write request may come from a computer processor (e.g., computer processor 102 of FIG. 1).

After receiving the write request, the controller performs step 504 and determines a tag address based on the memory address in the write request.

After determining the tag address, the controller then determines whether there is a cache-hit, in step 506. To determine whether there is a cache-hit, the controller may perform read operations to the tag portions to read the stored tag addresses, compare the stored tag addresses against the tag address determined in step 504, and determine a matching tag entry.

If the controller determines there is a cache-miss in step 506 (e.g., based on a determination that the tag address determined in step 504 cannot be found in the tag array), the controller can proceed to step 508 to obtain new data from the memory (e.g., DRAM 132), and proceed to step 509 to determine whether the data portion and the tag portion of the cache are idle. The controller can stay in step 509 (and withhold the write operation) until determining that the data portion and the tag portion of the cache are idle. After the controller determines that the data portion and the tag portion of the cache are idle, the controller can then proceed to step 510 to perform the write operations to the data portion and to the tag portion of the cache. After the write operations complete, the controller proceeds to step 511 to process the next request, and method 500 proceeds to end.

On the other hand, if the controller determines there is a cache-hit in step 506 after determining that a tag entry stores a tag address that matches with the tag address determined in step 504, the controller can determine the cache control information for the matching tag entry in step 512. The cache control information can include LRU information, data coherency status, etc. For example, if the LRU information of the matching tag entry indicates that the tag entry is associated with a least recently accessed data entry in the data array, the controller can update the LRU information to indicate that it is no longer the least recently accessed (rather, it is the most recently accessed). The controller can then proceed to step 514 and perform a write operation to the tag control buffer to store the cache control information.

The controller can then perform a write operation to store the write request information in the write buffer, in step 516. The write request information may include, for example, the write data, and a location of the data array (and which of a plurality of data arrays in cache 400) to be written, etc. After (or concurrent with) performing step 516, the controller can then proceed to step 518 to process the next data request. F5

The controller can then proceed to step 520 to perform the delayed write request. The delayed write request can be performed triggered by a preset condition. The preset condition may include, for example, the write buffer is full, the data array is idle, a subsequent read or write request being directed to the same entry in the data array as the delayed write request, etc.

As is known to those having ordinary skills in the art, functions of tag control buffer 314 in cache 300 can be implemented by the tag array 312. For example, tag array 312 may store the cache control information as well.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims. Method 500 can then proceed to an end.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:
1. A cache comprising:
   a tag portion comprising:
      a tag array configured to store one or more tag addresses, and a tag control buffer configured to store cache control information;
a data portion comprising:
a data array configured to store data acquired from a memory device, and
a write buffer configured to store information related to a write request; and
a controller configured to:
determine, based on the write request, whether there is a cache-hit, and
responsive to determining that there is cache-hit, perform a write operation to the write buffer to store write data associated with the write request and an identifier identifying an entry in the data array to receive the write data,
wherein the tag array is configured to be accessed independently from the tag control buffer and wherein the data array is configured to be accessed independently from the write buffer.

2. The cache of claim 1, wherein the tag array comprises an array of single-ported static random access (SRAM) devices.

3. The cache of claim 1, wherein the data array comprises an array of single-ported SRAM devices.

4. The cache of claim 1, wherein the tag control buffer comprises an array of flip-flops.

5. The cache of claim 1, wherein the cache control information includes at least one of: data coherency status, and least recently used (LRU) information.

6. The cache of claim 1, wherein the identifier comprises a first pointer to a first data entry within the data array, and a second pointer to a location with the first data entry.

7. The cache of claim 6, further comprising a second data array, wherein the identifier further comprises a third pointer to the second data array.

8. The cache of claim 1, wherein the controller is further configured to:
responsive to determining that there is cache-hit:
perform a write operation to the tag control buffer;
process a subsequent data access request; and
perform a write operation to a first data entry of the data array based on the information stored in the write buffer.

9. The cache of claim 8, wherein the write operation to the first data entry of the data array is performed responsive to determining at least one of: the write buffer being full, the data array being idle, and the subsequent data access request being directed to the first data entry.

10. A method of operating a cache that comprises a tag array, a tag control buffer, a data array, and a write buffer, the method comprising:
receiving a first write request including write data and a memory address;
receiving a second data access request;
determining a tag address based on the memory address;
performing a first read operation to the tag array to determine if there is a cache-hit; and
responsive to determining that there is a cache-hit:
performing a write operation to the write buffer to store write data associated with the first write request and an identifier identifying a first data entry in the data array to receive the write data, wherein the write buffer is included in a data portion of the cache,
performing a write operation to the tag control buffer to update stored cache control information, wherein the tag control buffer is included in a tag portion of the cache,
performing second read operations to the tag array and to the data array for the second data access request, and
performing a write operation to the first data entry of the data array based on the identifier and the write data stored in the write buffer.

11. The method of claim 10, wherein the second read operations to the tag array and to the data array for second request are performed before the write operation to the tag control buffer is completed.

12. The method of claim 10, wherein the write operation to the data array based on the identifier and the write data stored in the write buffer is performed before the second read operations to the tag array and to the data array for the second request are performed, the method further comprising:
determining to perform the write operation to the first data entry of the data array based on the identifier and the write data stored in the write buffer responsive to determining at least one of: the write buffer being full, the data array being idle, and second data access request is directed to the first data entry in the data array.

13. The method of claim 10, wherein the cache control information includes at least one of: data coherency status, and least recently used (LRU) information.

14. The method of claim 10,
wherein the identifier comprises a first pointer to the first data entry, and a second pointer to a location with the first data entry; and
wherein the cache further comprises a second data array, wherein the identifier further comprises a third pointer to the second data array.

15. A computer system, comprising:
a hardware processor; and
a hierarchical memory system coupled with the hardware processor, comprising:
a dynamic random access memory device; and
a cache comprising:
a tag portion comprising:
a tag array configured to store one or more tag addresses, and
a tag control buffer configured to store cache control information,
a data portion comprising:
a data array configured to store data acquired from the dynamic random access memory device, and
a write buffer configured to store information related to a write request from the hardware processor, and
a controller configured to:
determine, based on the write request, whether there is a cache-hit, and
responsive to determining that there is cache-hit, perform a write operation to the write buffer to store write data associated with the write request and an identifier identifying an entry in the data array to receive the write data;
wherein the tag array is configured to be accessed independently from the tag control buffer and wherein the data array is configured to be accessed independently from the write buffer.

16. The computer system of claim 15, wherein controller is further configured to:
responsive to determining that there is cache-hit:
perform a write operation to the tag control buffer;

process a subsequent data access request from the hardware processor; and perform a write operation to a first data entry of the data array based on the identifier stored in the write buffer;

wherein the write request to the data array is performed based on a determination of at least one of: the write buffer being full, the data array being idle, and the subsequent data access request is directed to the first data entry.

17. The computer system of claim 15, wherein each of the tag array and the data array comprises an array single-ported static random access (SRAM) devices; wherein the tag control buffer comprises an array of flip-flops.

18. A cache comprising:

a tag portion comprising:

a tag array configured to store one or more tag addresses and cache control information;

a data portion comprising:

a data array configured to store data acquired from a memory device, and a write buffer configured to store information related to a write request; and a controller configured to:

determine, based on the write request, whether there is a cache-hit, and responsive to determining that there is cache-hit, perform a write operation to the write buffer to store write data associated with the write request and an identifier identifying an entry in the data array to receive the write data, wherein the data array is configured to be accessed independently from the write buffer.

19. A method of operating a cache that comprises a tag array, a data array, and a write buffer, the method comprising:

receiving a write request including a first data and a memory address;

determining a tag address based on the memory address;

performing a read operation to the tag array to determine if there is a cache-hit;

responsive to determining that there is a cache-hit, performing a write operation to the write buffer to store the first data and an identifier identifying an entry in the data array to receive the first data, and performing a write operation to the tag array to update stored cache control information, wherein the write buffer is included in a data portion of the cache, and the tag array is included in a tag portion of the cache; and responsive to determining a preset condition is satisfied, performing a write operation to the data array based on the first data stored in the write buffer.

* * * * *